Jan. 10, 1950
C. NICOLLE
2,494,484
APPARATUS FOR OBTAINING MULTIPLE PACKAGES,
ESPECIALLY ADAPTABLE FOR TABLETS
AND SIMILAR PRODUCTS
Filed Jan. 23, 1947
4 Sheets-Sheet 1
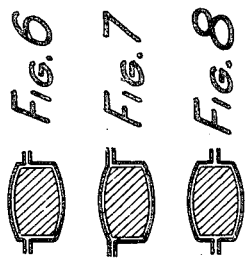
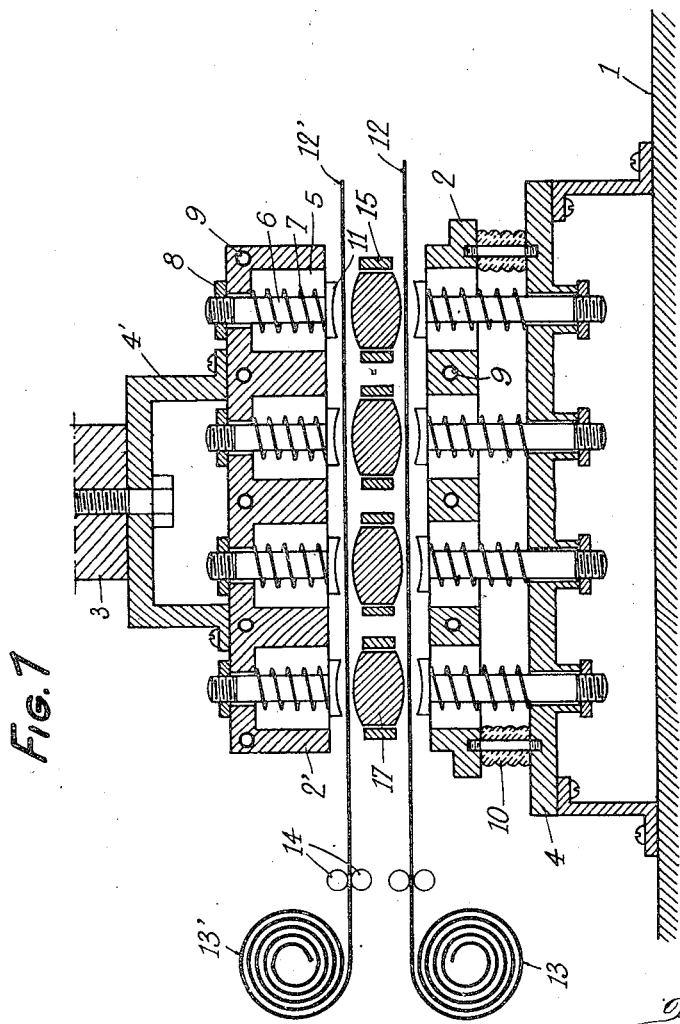

Jan. 10, 1950     C. NICOLLE     2,494,484
APPARATUS FOR OBTAINING MULTIPLE PACKAGES,
ESPECIALLY ADAPTABLE FOR TABLETS
AND SIMILAR PRODUCTS
Filed Jan. 23, 1947     4 Sheets-Sheet 2
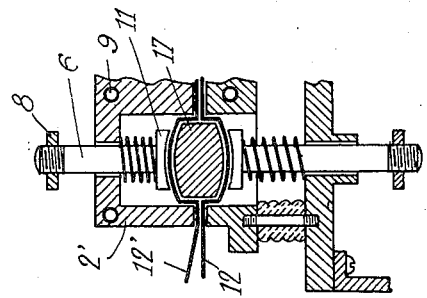
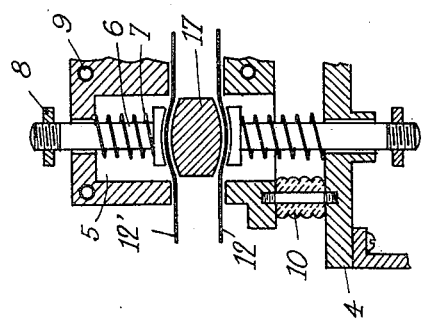
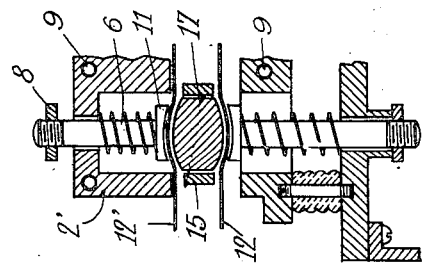
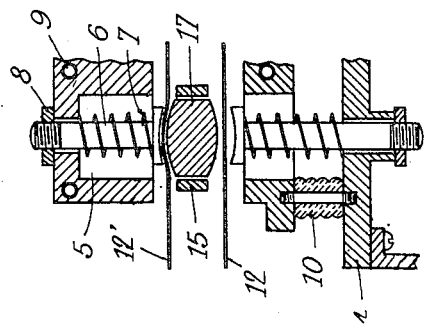
Inventor:
Charles Nicolle
By Hinkle, Horton, Adelberg, Hausmann & Wupper
Attorneys.

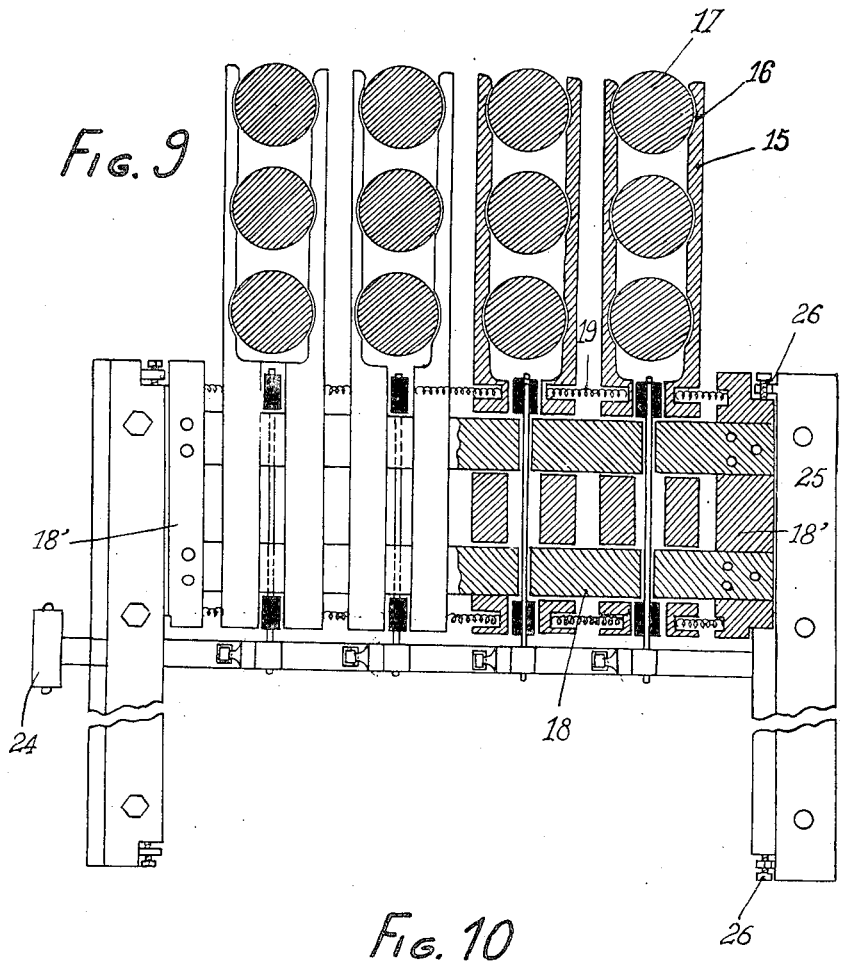

Jan. 10, 1950 C. NICOLLE 2,494,484
APPARATUS FOR OBTAINING MULTIPLE PACKAGES,
ESPECIALLY ADAPTABLE FOR TABLETS
AND SIMILAR PRODUCTS
Filed Jan. 23, 1947 4 Sheets-Sheet 4
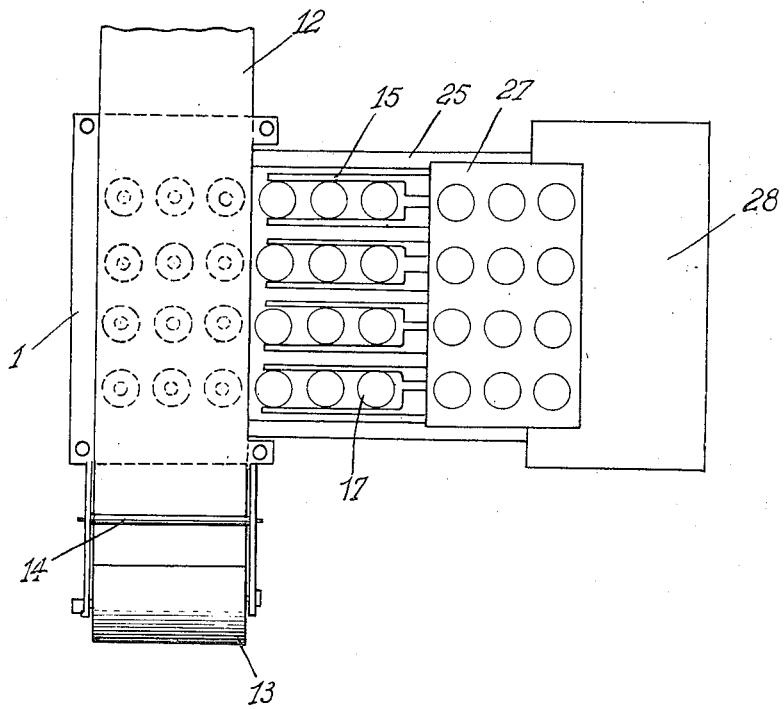
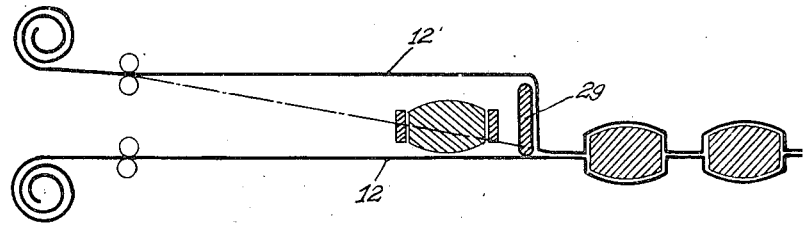
Inventor:
Charles Nicolle
By Hinkle, Horton, Aseburg, Hausmann & Wupper
Attorneys.

Patented Jan. 10, 1950

2,494,484

UNITED STATES PATENT OFFICE 2,494,484

APPARATUS FOR OBTAINING MULTIPLE PACKAGES, ESPECIALLY ADAPTABLE FOR TABLETS AND SIMILAR PRODUCTS

Charles Nicolle, Gentilly, France

Application January 23, 1947, Serial No. 723,759
In France January 22, 1946

Section 1, Public Law 690, August 8, 1946
Patent expires January 22, 1966

17 Claims. (Cl. 18—19)

Multiple forms of packages made of plastic materials are well known and extensively utilized for the packaging of various products, particularly for small articles or products or for packaging small quantities of materials. These plastic materials provide a satisfactory protective covering in conjunction with an attractive appearance. Such packages are produced from plain or pre-shaped and recessed strips or sheets of the plastic materials. When plain strips or sheets are employed, the articles or materials are merely enclosed between two plastic strips or sheets, such as cellophane sheets, and the sheets united around the articles or materials in known manner so that the plastic material becomes somewhat deformed to provide chambers or compartments in which the articles and materials are confined, preferably one article in each such chamber or compartment. When pre-shaped and recessed strips or sheets are employed, either or both thereof are first treated in suitable manner to form multiple recesses or depressions in each of which an article is placed and the two strips or sheets are then assembled and united so as to confine the articles in the individual recesses or depressions which closely correspond in size and shape to the articles to be packaged.

My invention has for its object the provision of a new apparatus by means of which packages of the recessed sheet type can be obtained with recesses in the shape of the goods to be packed, without any previous molding procedure and by starting with plastic material in plain sheet or strip form. Thus at one and the same time the benefits of both types of packages are secured.

Materials employed for the makeup of these packages at the present time are vinyl chlorides in the form of thin sheets, but other plastic materials can equally well be used provided they have the same or similar properties, i. e., flexibility under a wide range of temperature conditions, ability to be drawn and molded over the goods or articles to be packed, ability to be directly united under the action of heat and preferably, watertightness.

The invention further relates to apparatus for producing the novel package by the method disclosed above and this apparatus includes in its preferred form the following salient features:

1. A loading device which carries and holds the goods or articles to be packed in the desired positions relative to one another, and which is inserted and remains stationary between the two sheets of plastic material during an intermediate stage of the wrapping operation, being withdrawn when the goods are grasped and held in position between the two sheets by other devices acting to press the sheets against the goods from opposite sides thereof.

2. Means, such as a double set of spring plungers, exerting a multiple grip action on the sheets and the goods or articles therebetween, said goods or articles being thus immobilized with respect to the sheets in the proper desired positions, and said means becoming effective upon the withdrawal of the loading device.

3. Heated dies in which the spring plungers are slidingly mounted and provided with opposite surfaces for uniting the sheets around the goods or articles, one such die being stationary and mounted on the table of a press and the other being movable and mounted rigidly with the slide-block of this press.

4. A series of arms provided with spaced recesses along the length thereof and constituting holding members between which the individual products or units to be packaged automatically take up their proper spaced positions, such arms being associated with and preferably constituting a part of the loading device.

5. Each pair of holding members has two arms which are spring urged towards each other and cam-actuated away from each other or otherwise separated at predetermined intervals in the wrapping operation.

6. A carriage on which the loading and holding devices are mounted for movement to and away from the wrapping station.

7. Distance pieces on the carriage for maintaining the sheets of plastic material in suitably spaced relation at the wrapping station during the stage when the goods are being brought to their desired predetermined positions for wrapping. Such pieces are preferably tapered toward their front ends.

8. When producing wrapped packages with the wrapping unsymmetrically applied, dissimilarly tensioned springs are employed between the respective dies and the plungers mounted therein.

9. Means for providing correlated and synchronized movements of the positioning carriage and of the slide-block of the press, and to regulate the opening and closing movements of the holding arms of the loading device.

Other significant features and advantages of the present invention will be understood and appreciated from the following description when read with reference to the accompanying drawings in which a preferred embodiment of the apparatus has been shown diagrammatically by way of example only.

In the drawings:

Fig. 1 is a sectional view of an apparatus according to the invention by means of which tablets, for instance, may be packed between sheets of vinyl chloride or a similar type of plastic material.

Figs. 2, 3, 4, 5 are fragmentary sectional views of a portion of the machine mentioned above showing certain parts in their working positions.

Figs. 6, 7, 8 show diagrammatic sections of various constructional forms of packages which may be produced by the use of springs of like tension and of various diverse tensions.

Fig. 9 is a plan view, partly in section, of a loading and positioning device employed in cooperation with the shaping and sealing device of Fig. 1.

Fig. 10 is an elevational view, partly in section, of the said loading and positioning device.

Fig. 11 is a plan view on a reduced scale of the assembly of the apparatus with the upper portion of the press removed, and Fig. 12 is a diagrammatic elevational view showing the spacing members for the two sheets which permits the insertion of the positioning device between the two sheets.

Thus, as will be observed in the drawings, the apparatus employed for the making up of packages of vinyl chloride or similar types of plastic material in accordance with the invention comprises a press of which the lower fixed platform illustrated in diagrammatic manner by its flat surface 1 in Fig. 1, carries a die 2 and of which the movable slide-block 3 supports a die 2'.

These two dies 2 and 2' are suitably carried by the platform 1 and by the slide-block 3, respectively, by means of intermediate frame members such as those shown at 4 and 4'.

The dies 2 and 2' are provided with openings 5 in which the plungers 6 are mounted for sliding movement in the dies and these plungers are furnished with helical encircling springs 7 which constantly urge them toward the open ends of their respective openings.

These plungers extend through the openings 5 and through holes in the respective die end walls. The ends of such plungers that project through the end walls of the dies are threaded and provided with nuts or washers 8 which normally abut against the outer side of the die end wall. When they are in retracted position the springs hold the plungers in the positions shown in Fig. 1. By advancing or retracting the nuts or washers 8, adjustments of the plungers can be effected.

The dies 2 and 2' are heated, preferably by means of electric resistances 9 inserted in the body of the dies.

Between the die 2 and the frame member 4, insulating support pieces 10 may be placed, if considered desirable. Such support pieces may also be similarly provided between the die 2' and the frame member 4'.

The distal end of each of the plungers 6 is provided with an enlarged head 11 the surface of which is substantially complementary to the surface of the articles to be packed. Thus, when those articles are convex, the surface of each head 11 is concave and of like curvature as the surface of the article.

The sheets 12 and 12' of vinyl chloride or similar plastic material are fed, for instance, from rolls 13 and 13' between suitable directing rolls or rollers such as 14 and thence pass between the dies 2 and 2'.

Pairs of arms 15 of a positioning and loading device such as that shown in Figs. 9 and 10, are introduced between sheets 12 and 12' and retracted therefrom at predetermined intervals. Each pair of arms 15 is provided with opposed recesses 16 in which articles such as tablets 17 are received and held. The arms 15 are constructed and arranged so as to slide on crossmembers 18 and the two arms of any one pair are normally urged towards each other through the action of springs 19 placed between the adjacent arms of two neighboring pairs. They may be moved away from each other so as to release the tablets 17 through the agency of cams 20 carried by pins 21 turned by cranks 22 pivoted to and controlled simultaneously by a rod 23 which is actuated by a handle 24 or by any other suitable member.

The cross-members 18 and members 18' constitute a framework which is capable of being moved in slide-blocks 25, thus forming a slidable carriage for the positioning device, adjusting screws 26 providing adjustable limits for the forward and rearward motion of this carriage.

As will be observed in Fig. 11, in which the upper portion of the machine has been assumed to be removed, the positioning device may be loaded by means of a distributing plate 27 associated with means 28 for filling the recesses of such plate, said plate and means being, for instance, of the type described in my United States Patent No. 2,363,014 dated November 21, 1944. It is, therefore, unnecessary to describe here the distributing mechanism since it does not per se form a part of this invention and since it may specifically differentiate from that of the said United States patent.

The carriage formed of the members 18 and 18' with the clamping arms 15 is provided with one or more spacing members 29 for the two sheets 12 and 12' (see Fig. 12), these spacing members being tapered off at the front ends so that they may be inserted between the two sheets 12 and 12' in such manner as to spread them apart and enable easy entry of the positioning device. In this manner, when a series of packages, already shaped, is drawn towards the right, the two sheets will be maintained spread far apart enough to permit the insertion of the positioning device.

The operation of the apparatus described is as follows:

With the positioning device empty, the distributing plate 27 is caused to slide above the pairs of arms 15 which are maintained in spaced apart position to receive the tablets 17 by appropriate movement of the handle 24.

The tray of the distributing plate 27 is opened and the tablets then fall between the spread arms 15, being prevented from falling too far by a plate 30 situated just below the arms and rigidly connected to the slide-blocks 25 (Fig. 10).

By further appropriate movement of the handle 24, the cams 20 straighten up and the springs 19 act to bring the arms 15 of each pair closer to one another, whereupon the tablets then automatically seat in the opposed slots or recesses 16 of such arms.

The positioning device is then caused to slide in the slide-blocks 25 and the arms 15, with their load of tablets, are introduced in this way between the two sheets 12 and 12' which have been previously spread apart (Fig. 12) by the spacing member 29. During this time, the distributing plate 27 has returned to the filling means 28 ready to receive another load of tablets.

In the above disclosure, the distributing plate 27 has been described as sliding above the arms 15, but, in a modified form of the invention, this plate is fixed and the arm-carrying carriage is moved toward the rear of the apparatus so as to bring the arms 15 below the plate 27 to receive a load of tablets.

For obtaining a large production of packages, a double loading system may be provided with one such device disposed on each side of the press and connected for alternate operation.

When the arms 15 with their load of tablets 17 are between the two sheets 12 and 12' and the positions of the tablets are in register with the holes or openings 5 of dies 2 and 2', the press is operated by acting on the slide-block 3 of the latter and the upper die 2' is brought down until the upper plungers 6 have made contact with the upper sheet 12' and with the upper surface of the tablets 17 (position of Fig. 2).

As the downward movement of the upper die continues, the tablets 17 slide gently in the arms 15 of the positioning device and come into contact with the lower sheet 12 which is somewhat depressed into contact with the lower plungers (position of Fig. 3). Since the springs 7 have now become compressed they exert pressure on the plungers and thus on the tablets 17 so that the latter are no longer capable of independent movement but are immobilized between the upper and lower plungers. At this instant, the downward movement of the press ceases for a time during which the arms 15 of the positioning device are spread to release the tablets and are then moved rearwardly by the backward movement of the said device. The tablets are thus left in their previously assumed positions except that they are no longer held or engaged by the arms 15 but are held by the two upper and lower plungers 6 which press upon them (position of Fig. 4) through the interposed sheets 12.

The downward movement of the slide-block 3 is then resumed, the dies 2 and 2' continue their movement towards each other while the plungers hold both the sheets and the tablets between them. During this stage, the tablets act as molding punches and the sheets 12 and 12' become shaped as a result of this molding action to form recesses having the same shape as the tablets 17 (see Fig. 5).

At the end of the downward movement, the flat portions formed around the tablets by the flat bearing surfaces of the dies are brought into contact with each other and, since the dies are heated by the electric resistances 9, these flat portions are united under the action of heat and pressure. The packaging of the tablets is thus completed in a tightly-closed and secure manner, substantially entirely eliminating air from the inside of the package. The slide-block 3 of the press is then raised and the resulting multiple package is then discharged by moving it toward the right hand side of the apparatus as viewed in Fig. 1. As it leaves the press, it may be suitably severed or slit, according to requirements, into strips, plates, etc.

In the foregoing description, it has been assumed that the lower plate 1 of the press is stationary, and that only the upper slide-block 3 is movable. It is clear, however, that the opposite arrangements may equally well be adopted if so desired and that a press may be constructed in which both dies or plates are movable and actuated toward and away from one another. In such a modification of the invention, it would be unnecessary to provide for movement of the tablets in the recesses of the arms 15, and this would prove of advantage in dealing with very delicate tablets.

Moreover, if desired, a mechanical synchronization of the various operations may be affected so as to make the apparatus completely automatic, with the movements of the positioning device and of the press correlated for this purpose.

The sheets 12 and 12' employed as the packaging material may be, if so desired, printed beforehand at the required spots, for instances, at the exact location of the tablets or articles 17.

It may be observed, moreover, that the flat portions of the packaging material between the individual packages may be striated or grooved by appropriately shaping the surfaces of the opposed die faces. In general, also, the present packages may embody the improvements proposed in my various previous patents relating to pre-recessed packages consistent with the objects and disclosure of the present application.

Furthermore, by suitably adjusting the tension of the springs 7 of the upper die and of the lower die to different values, I can form not only symmetrical packages, such as that illustrated in Fig. 8 (the case where the upper and lower springs 7 are adjusted to an equal tension), but also unsymmetrical packages, such as those illustrated in Figures 6 and 7 (cases in which the upper springs 7 have a higher tension than the lower springs).

It will be noted, from the above disclosure, that it is easy with sheets of vinyl chloride, to form recessed packages in which the recesses conform to the shape of the articles to be packed, and that the sheets of the said plastic materials confine very closely the articles in question and have moreover the great benefit of being watertight.

It is to be understood that the equipment that has been disclosed above and illustrated in the drawings is intended only as an example.

Modification may be made in its constructional details without any change in the general organization of the invention and without departing from the spirit and principle thereof.

Thus, in particular, the loading device that provides an outstanding auxiliary feature of the invention may be replaced by another loading and positioning device of a similar type.

What I claim is:

1. An apparatus for producing a multiple package containing a plurality of small articles individually enclosed between two superposed sheets of plastic material comprising means for carrying and holding a number of said articles in the desired relative position to one another, means for inserting said first means between and removing it from between the said sheets, means for releasing the articles from the carrying and holding means while the latter is inserted between said sheets, means for pressing the sheets toward each other and deforming them over the articles disposed therebetween and means for securing the sheets together around each such article.

2. An apparatus for producing a multiple package containing a plurality of small articles individually enclosed between two superposed sheets of plastic material comprising means for carrying and holding a number of said articles in the desired relative position to one another, means for inserting said first means between and removing it from between the said sheets, means for releasing the articles from the carrying and holding means while the latter is inserted between said sheets, means for pressing the sheets toward each other and deforming them over the articles disposed therebetween and means for securing the sheets together around each such article, said pressing means including two cooperating series of plungers adapted to clamp the articles between the two sheets of plastic material and springs acting on said plungers and urging them toward said articles.

3. An apparatus for producing a multiple package containing a plurality of small articles individually enclosed between two superposed sheets of plastic material comprising means for carrying and holding a number of said articles in the desired relative position to one another, means for inserting said first means between and removing it from between the said sheets, means for releasing the articles from the carrying and holding means while the latter is inserted between said sheets, means for pressing the sheets toward each other and deforming them over the articles disposed therebetween and means for securing the sheets together around each such article, said pressing means including two cooperating series of plungers adapted to clamp the articles between the two sheets of plastic material and springs acting on said plungers and urging them toward said articles; a pair of opposed dies having openings in which the plungers are slidably mounted and cooperating surfaces around said openings, means within the dies for heating said surfaces and means for advancing the dies toward one another until the plastic sheets are deformed around said articles and the undeformed portions of said sheets are heat-sealed together.

4. An apparatus for producing a multiple package containing a plurality of small articles individually enclosed between two superposed sheets of plastic material comprising positioning means including a plurality of pairs of clamping arms of which each pair is adapated to hold between them a plurality of such articles, the relative positions of the articles so positioned corresponding to their desired locations in the finished package, means for inserting said clamping arms between and withdrawing them from between the superposed sheets of plastic material, means for opening each pair of clamping arms to release the articles held thereby, means for pressing the sheets together over the articles thus inserted between the sheets and for heat-sealing the sheets together at the areas thereof around said articles.

5. An apparatus for producing a multiple package containing a plurality of small articles individually enclosed between two superposed sheets of plastic material comprising positioning means including a plurality of pairs of clamping arms of which each pair is adapated to resiliently hold a plurality of alined articles, the relative positions of the articles as positioned corresponding to their desired locations in the finished packacke, means for inserting said arms between and withdrawing them from between the superposed sheets of plastic material, means for opening each pair of clamping arms, opposed sets of plungers for urging the sheets together over the articles thus inserted therebetween and heatable dies associated with said plungers for exerting pressure on the said sheets for heat-and-pressure sealing the sheets together at the areas around said articles.

6. An apparatus for producing a multiple package containing a plurality of small articles individually enclosed between two superposed sheets of plastic material comprising positioning means including a plurality of pairs of clamping arms of which each pair is adapted to hold between them a plurality of such alined articles, the relative positions of the articles so positioned corresponding to their desired locations in the finished package, springs normally urging the clamping arms of each pair towards one another, cams operable to spread said arms apart, a common control device adapted to actuate said cams from the exterior of the apparatus, means for inserting the positioning means between and withdrawing it from between the superposed sheets of plastic material, means for pressing the sheets together over the articles thus inserted between the sheets and means for heat-sealing the sheets together at the areas thereof around said articles.

7. An apparatus for producing a multiple package containing a plurality of small articles individually enclosed between two superposed sheets of plastic material comprising positioning means for carrying and holding in the desired relative positions a plurality of the articles to be packaged, a carriage to which said positioning means is secured, a frame within which the carriage is slidably mounted for movement between an outer position beyond the sheets and an inner position between the sheets, means for loading articles into the positioning means in the outer position thereof, externally operable means for releasing the articles in the inner position between the sheets and means for pressing the sheets together over the articles therewithin and for bonding the sheets together at their areas around the articles.

8. An apparatus for producing a multiple package containing a plurality of small articles individually enclosed between two superposed sheets of plastic material as defined in claim 7 in which the said carriage is provided with a spacing member for maintaining the sheets in spaced relation while inserting the positioning means therebetween.

9. An apparatus for producing a multiple package containing a plurality of small articles individually enclosed between two superposed sheets of plastic material comprising positioning means for carrying and holding in the desired relative positions a plurality of the articles to be packaged, means for inserting said positioning means between and withdrawing it from between said plastic sheets, externally operable means for releasing the articles from the positioning means while the latter is inserted between said sheets, means for pressing the sheets together over the articles inserted therebetween which includes two opposed sets of plungers adapted to press upon said sheets and articles to hold said articles in predetermined position between said sheets, springs normally urging the plungers toward said articles, means for securing the sheets together around the individual articles and means for varying the thrust exerted by said springs on the plungers to produce symmetrical or unsymmetrical packages.

10. An apparatus for producing a multiple package containing a plurality of small articles individually enclosed between two superposed sheets of plastic material comprising positioning means for carrying and holding a plurality of such articles in the desired relative positions, a carriage to which said positioning means is secured, a frame within which the carriage is slidably mounted for movement between an outer position beyond the sheets and an inner position between the sheets, means for loading the articles into the positioning means when the latter is in its outer position, means for releasing the articles from the positioning means when the latter is in its inner position, means for pressing the sheets together over the articles inserted therebetween and for bonding the sheets together at the areas around the individual articles and timing means for controlling the movements of the carriage, the article releasing means and the sheet pressing and bonding means.

11. Apparatus for producing multiple packages which comprises a pair of relatively movable dies each of which is provided with a plurality of openings, a plunger resiliently disposed in each such die opening, means for imparting linear movement to at least one of said dies to bring them into close proximity to each other and to retract them to spaced positions, means for passing a pair of plastic packaging sheets between said dies while they are in spaced position, means for inserting a plurality of articles to be packaged between said sheets and means for deforming said sheets to enclose said articles individually and for uniting said sheets around each of said articles.

12. An apparatus having the construction defined in claim 11 in which each of the plungers is axially disposed within its die opening, one end of each such plunger projecting through the die wall and being provided with an adjustable positioning instrumentality on its projecting end and the other end thereof being provided with an enlarged head having a surface complementary to the article to be packed, the intermediate shank portion of each such plunger being encircled by a helical spring and acting to urge said plunger inwardly through said die opening.

13. An apparatus of the construction defined in claim 11 in which the means for inserting articles between said sheets includes a plurality of pairs of recessed arms each pair of which is adapted to receive a plurality of articles to be packed and all such pairs of arms being actuatable from a position outside the space between said sheets to a position between said sheets, the arms of each such pair being additionally movable toward and away from each other for holding and releasing said articles.

14. An apparatus of the construction defined in claim 11 in which the means for inserting said articles between said sheets includes a plurality of pairs of parallel arms recessed on their inner faces and movable toward and away from each other, springs acting upon said arms and normally urging them toward one another and cams mounted between said arms and adapted to move said arms away from one another in opposition to said springs.

15. An apparatus of the construction defined in claim 11 in which the means for inserting said articles between said sheets includes a plurality of pairs of parallel arms recessed on their inner faces and movable toward and away from each other, springs acting upon said arms and normally urging them toward one another, cams disposed between said arms and capable of moving said arms away from one another in opposition to said springs, rotatable pins associated with said pairs of arms and on which said cams are secured, cranks connected to said cams and a rod to which each of said cranks is pivoted, said rod being mounted for longitudinal movement and when so moved acting to change the positions of said cranks and to effect corresponding movement of said cams.

16. An apparatus of the construction defined in claim 11 in which means is provided for separating said sheets prior to the insertion of said ar- articles therebetween and for maintaining them temporarily in spaced vertical relationship.

17. An apparatus of the construction defined in claim 11 in which a bar-like spacing member which tapers toward one end is provided for separating said sheets prior to the insertion of said articles therebetween and for maintaining them temporarily in spaced vertical relationship until said articles are deposited in position.

CHARLES NICOLLE.

REFERENCES CITED

The following references are of record in the file of this patent:

UNITED STATES PATENTS

| Number | Name | Date |
|---|---|---|
| 1,489,379 | Zeller | Apr. 8, 1924 |
| 1,583,381 | Zimmerman | May 4, 1926 |
| 1,986,422 | Zwoyer | Jan. 1, 1935 |
| 1,989,944 | Quigg | Feb. 5, 1935 |
| 2,083,617 | Salfisberg | June 15, 1937 |
| 2,155,445 | Pittenger et al. | Apr. 25, 1939 |
| 2,210,509 | Strauch | Aug. 6, 1940 |
| 2,340,260 | Clunan | Jan. 25, 1944 |
| 2,438,089 | Carson | Mar. 16, 1948 |